US006783226B2

(12) United States Patent
Szlucha

(10) Patent No.: US 6,783,226 B2
(45) Date of Patent: Aug. 31, 2004

(54) CURVED INFRARED FOIL HEATER FOR DRYING IMAGES ON A RECORDING MEDIUM

(75) Inventor: Thomas F. Szlucha, Penfield, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 10/377,905

(22) Filed: Feb. 27, 2003

(65) Prior Publication Data

US 2004/0061759 A1 Apr. 1, 2004

Related U.S. Application Data

(60) Provisional application No. 60/413,698, filed on Sep. 26, 2002.

(51) Int. Cl.[7] ........................ B41J 2/01; G03G 15/20; B23K 9/067; B23K 9/073; H05B 1/00

(52) U.S. Cl. ..................... 347/102; 347/101; 399/320; 219/50

(58) Field of Search ............................ 347/101, 102; 399/320; 219/50

(56) References Cited

U.S. PATENT DOCUMENTS

| | | | | | |
|---|---|---|---|---|---|
| 4,165,456 | A | * | 8/1979 | Dogliotti | 219/447.1 |
| 4,463,246 | A | * | 7/1984 | Tatsumi et al. | 347/202 |
| 4,537,492 | A | * | 8/1985 | Lein et al. | 399/156 |
| 5,281,442 | A | * | 1/1994 | Fulton et al. | 427/374.5 |
| 5,510,822 | A | * | 4/1996 | Vincent et al. | 347/102 |
| 5,742,315 | A | | 4/1998 | Szlucha et al. | 347/102 |
| 6,085,058 | A | * | 7/2000 | Goto et al. | 399/313 |
| 6,088,931 | A | * | 7/2000 | Aylor et al. | 34/267 |
| 6,231,176 | B1 | | 5/2001 | Peter | 347/102 |
| 2001/0032835 | A1 | * | 10/2001 | Murooka et al. | 219/216 |

* cited by examiner

*Primary Examiner*—Lamson Nguyen
*Assistant Examiner*—Leonard Liang
(74) *Attorney, Agent, or Firm*—Oliff & Berridge, PLC; Eugene Palazzo, Esq.

(57) ABSTRACT

A print head for a liquid ink printer deposits liquid ink droplets on a recording medium. A curved infrared foil heater is disposed adjacent to the recording medium path opposite the print head, for heating the recording medium to dry the liquid ink droplets. The foil heater is an infrared emitting, etched foil circuit heater mounted within a channel in a frame to curve and thus self-tension to prevent wrinkling of the foil heater despite any thermal expansion of the foil heater.

6 Claims, 2 Drawing Sheets

CURVED INFRARED FOIL HEATER FOR DRYING IMAGES ON A RECORDING MEDIUM

This application is based on a Provisional Patent Application No. 60/413,698, filed Sep. 26, 2002.

BACKGROUND OF THE INVENTION

The invention relates generally to a liquid ink printer and, more particularly, to a curved infrared foil heater which is used to dry images formed on a recording medium in a liquid ink printer.

Liquid ink printers of the type frequently referred to as continuous stream or as drop-on-demand, such as piezoelectric, acoustic, phase change wax-based or thermal, have at least one print head from which droplets of ink are directed towards a recording medium. Within the print head, the ink is contained in a plurality of ink channels. Power pulses cause the droplets of ink to be expelled as required from nozzles at the end of the ink channels.

In a thermal ink jet printer, the power pulse is usually produced by a heater transducer or a resistor, typically associated with one of the ink channels. Each resistor is individually addressable to heat and vaporize ink in the ink channels. As voltage is applied across a selected resistor, a vapor bubble grows in the associated ink channel and initially bulges from the channel nozzle followed by collapse of the bubble. The ink within the ink channel then retracts and separates from the bulging ink thereby forming a droplet moving in a direction away from the channel nozzle and towards the recording medium whereupon hitting the recording medium a dot or spot of ink is deposited. The ink channel is then refilled by capillary action, which, in turn, draws ink from a supply container of liquid ink.

The ink jet print head is typically incorporated into a carriage type printer which has a relatively small print head containing the ink channels and nozzles. The print head can be sealingly attached to a disposable ink supply cartridge. The combined print head and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed.

Many liquid inks and particularly those used in thermal ink jet printing, include a colorant or dye and a liquid which is typically an aqueous liquid vehicle, such as water, and/or a low vapor pressure solvent. The ink is deposited on the paper to form an image in the form of text and/or graphics. Once deposited, the liquid component is removed from the ink and the paper to fix the colorant to the paper by either natural air drying or by active drying. In natural air drying, the liquid component of the ink deposited on the paper is allowed to evaporate and to penetrate into the paper naturally without mechanical assistance. In active drying, the paper is exposed to heat energy of various types which can include infrared heating, conductive heating and heating by microwave energy.

Active drying of the image can occur either during the imaging process or after the image has been made on the recording medium. In addition, the recording medium can be preheated before an image has been made to precondition the recording medium in preparation for the deposition of ink. Preconditioning of the recording medium typically prepares the recording medium for receiving ink by driving out excess moisture which can be present in a recording medium such as paper. Not only does this preconditioning step reduce the amount of time necessary to dry the ink once deposited on the recording medium, but this step also improves image quality by reducing paper cockle and curl which can result from too much moisture remaining in the paper.

Slow to medium drying inks are currently used in most ink products and printers to provide for optimum print quality for black to achieve performance comparable to xerographic toner images. These slow to medium inks typically take 45–60 seconds to dry at ambient environment by natural air drying. Drying times over a wide variety of recording media in stress environments can be driven under 5 seconds with the use of an active dryer.

A planar thin foil heater has been used in the prior art to actively dry deposited ink on the recording medium. Unfortunately, these thin foil heaters suffer from wrinkling on the surface due to non-uniform thermal expansion during heating. Wrinkling of the thin foil heater surface causes uneven heating and drying of the ink on the recording medium.

Other disadvantages to thin foil heaters include undesirable heatsinking or heating of other printer components due to conduction of heat away from the foil heater through its mounting structure.

U.S. Pat. No. 5,742,315 to Szlucha et al., commonly assigned as the present application and herein incorporated by reference, uses a spring attached to one end of the foil heater to self-tension the flat heater foil to prevent wrinkling of the foil heater due to thermal expansion of the heater foil.

U.S. Pat. No. 6,231,176 to Peter, commonly assigned as the present application and herein incorporated by reference, uses a bowed leaf spring to self-tension a flat foil heater to prevent wrinkling of the heater foil due to thermal expansion of the heater foil.

It is an object of the present invention to provide a non-spring means to self-tension a foil heater to prevent wrinkling.

It is another object of the present invention to provide a curved foil heater to self-tension to provide a wrinkle-free heating surface opposite the print head for active drying deposited ink on the recording medium.

SUMMARY OF THE INVENTION

According to the present invention, there is provided an ink jet printing machine for printing liquid ink images on a recording medium moving along a recording medium path through a printing zone. The printing machine includes a print head for image-wise depositing liquid ink droplets on the recording medium; and a curved foil heater, disposed adjacent to the recording medium path opposite the print head, for heating the recording medium to dry the image-wise liquid ink droplets. The foil heater is an infrared emitting, etched foil circuit heater mounted within a channel in a frame to curve and thus self-tension to prevent wrinkling of the foil heater despite any thermal expansion of the foil heater.

Other objects and attainments together with a fuller understanding of the invention will become apparent and appreciated by referring to the following description and claims taken in conjunction with the accompanying drawings.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

DETAILED DESCRIPTION

In the following detailed description, numeric ranges are provided for various aspects of the embodiments described. These recited ranges are to be treated as examples only, and are not intended to limit the scope of the claims hereof. In addition, a number of materials are identified as suitable for various facets of the embodiments. These recited materials are to be treated as exemplary, and are not intended to limit the scope of the claims hereof. In addition, the figures are not drawn to scale for ease of understanding the present invention.

Figure 1:
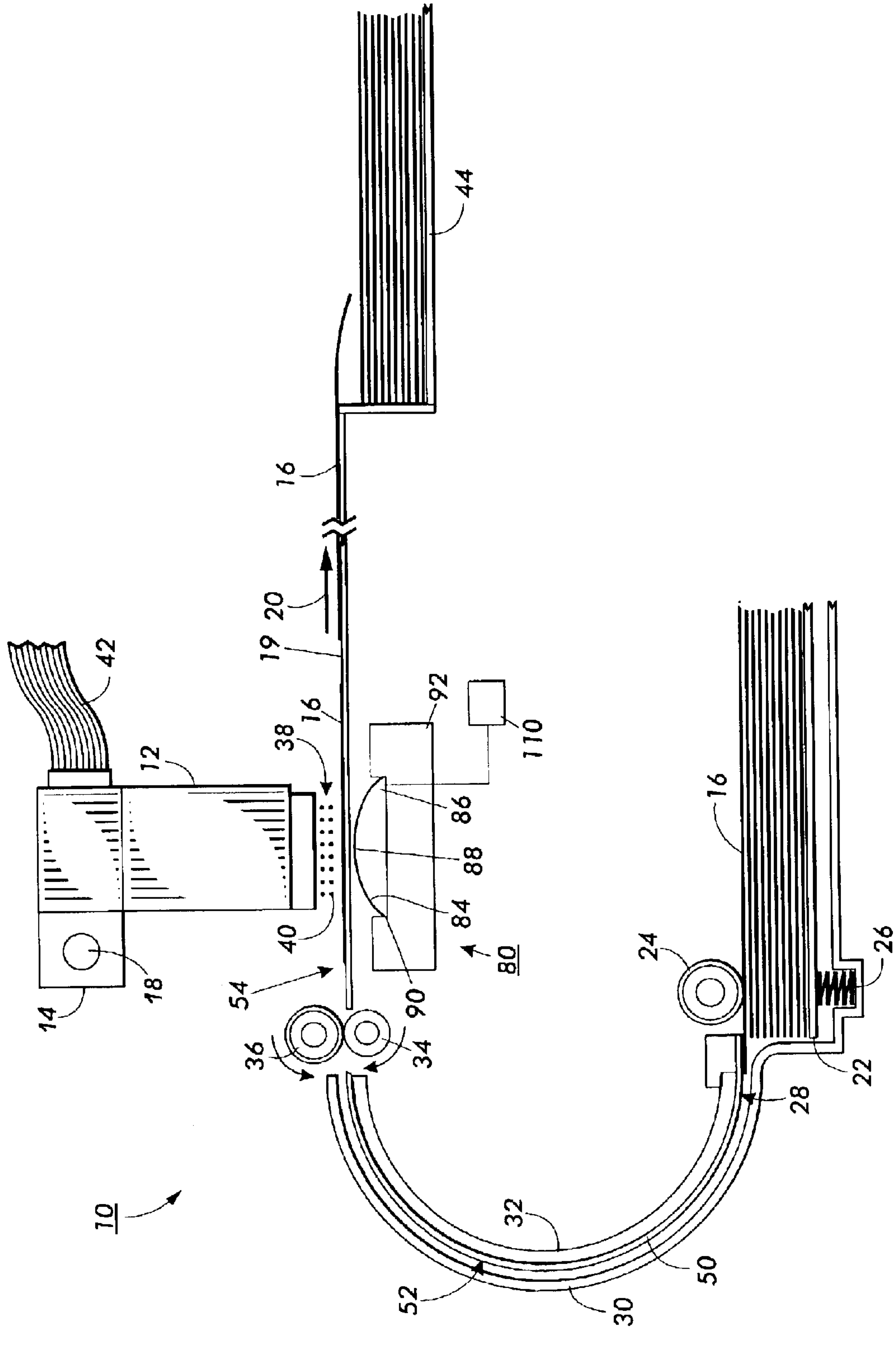
FIG. 1 is a schematic elevational side view of an ink jet printer which incorporates a curved infrared foil heater in the print zone in accordance with the present invention.

Although the present invention discussed herein may be used for drying any image which is created by a liquid ink printer, the description of the present invention will be described in the environment of an ink jet printer such as that shown in FIG. 1. FIG. 1 illustrates a schematic representation of a thermal ink jet printer 10 in a side elevation view. A translating ink jet print head 12 printing black and/or colored inks is supported by a carriage 14 which moves back and forth on a guide rail 18, across a recording medium 16, such as a sheet of paper or a transparency.

Multiple print heads printing different colors are also within the scope of this invention. The recording medium 16 is moved along a recording medium path 19 through the printer in the direction noted by the arrow 20. Single sheets of the recording medium 16 are fed from a tray 22 by a document feed roll 24. The document tray 22 is spring biased by a biasing mechanism 26 which forces the top sheet of the stack of recording sheets held by the tray 22 into contact with the feed roll 24. A top recording medium 16 in contact with the drive roll 24 is transported by the drive roll 24 into a chute 28 which is defined by an outer guide member 30 spaced from an inner guide member 32, each of which are curved to thereby reverse the direction of the recording sheets 16 for printing by the print head 12. Once the recording medium exits the chute 28, the recording medium 16 is driven into the nip of a drive roll 34 cooperating with a pinch roll 36 to advance the recording sheet 16 into a printing zone 38.

The printing zone 38 is the area directly beneath the print head 12 where droplets of ink 40 are deposited by an array of ink nozzles printing a swath of information and arranged on a front face of the print head. The front face of the print head is substantially parallel to the recording medium. The carriage 14, traveling orthogonally to the recording medium 16, deposits the ink droplets 40 upon the recording medium 16 in an image-wise fashion.

The print head 12 receives ink from either an attached ink tank or from an ink supply tube (not shown). The image deposited upon the recording medium 16 can include text and/or graphic images, the creation of which is controlled by a controller, known to those skilled in the art, in response to electrical signals traveling through a ribbon cable 42 coupled to the print head 12. Before the recording medium 16 has completely left control of the drive roll 34 and the pinch roll 36, an exit drive roll/pinch roll combination (not shown) or other known means captures the leading edge of the recording medium 16 for transport to an output tray 44 which holds printed recording medium.

Thermal ink jet printing image quality benefits from heat applied to the recording medium prior to and during the printing process. Removal of ambient moisture and heating of the paper before and during printing causes ink to penetrate the paper quickly and minimizes the length of time that ink resides on the surface in a puddle. Ink will then penetrate down into the paper instead of across the surface. This results in improvements in print quality due to reduced spot size, line width and inter-color bleed. Removal of most ambient moisture from the paper prior to printing is necessary to assure dimensional stability during the printing process.

Therefore to fix the liquid ink droplets to the recording medium 16, the moisture which makes the ink liquid must be driven from the ink droplets. While it is possible to dry the ink droplets by natural air drying, natural air drying can create certain problems such as cockle or curl and can also reduce the printing throughput of the printer. Consequently, active drying by the application of heat energy to the printed recording medium 16 is preferred, such heat energy is provided effectively by heating assemblies including the curved infrared foil heater of the present invention.

The heating assemblies for example include a first heating assembly 50 that is located in a first heating area 52, along the inside of the chute 28, in contact with and supported by the inner guide section 32, and extends to just about the start of the printing zone 38. The first heating assembly 50 is located within the chute 28 such that the side of the recording medium opposite the side to be printed on comes into direct contact with the heating assembly 50. Heat energy is delivered primarily through contact and conduction. The inner guide section 32 can include apertures, such as round holes, diagonally placed slots, or raised areas to aid in shortening warm-up times.

The first heating assembly 50 preheats the recording medium and is primarily necessary when printing on stress papers, since the absorption and desorption of water relaxes the internal stresses of the paper and can result in deformation, such as cockle. The preheating removes excess moisture from the paper and results in a more dimensionally stable sheet as well as improving ink absorption into the paper.

Thus, the first heating assembly 50 forms a preheating or first heating area 52 for preheating the recording medium or paper 16 before it enters the printing zone 38. As further shown, the printer 10 includes a second heating area 54 that is coincident with the printing zone 38 so as to effectively apply heat energy to the backside of the recording medium 16 during printing.

Figure 2:
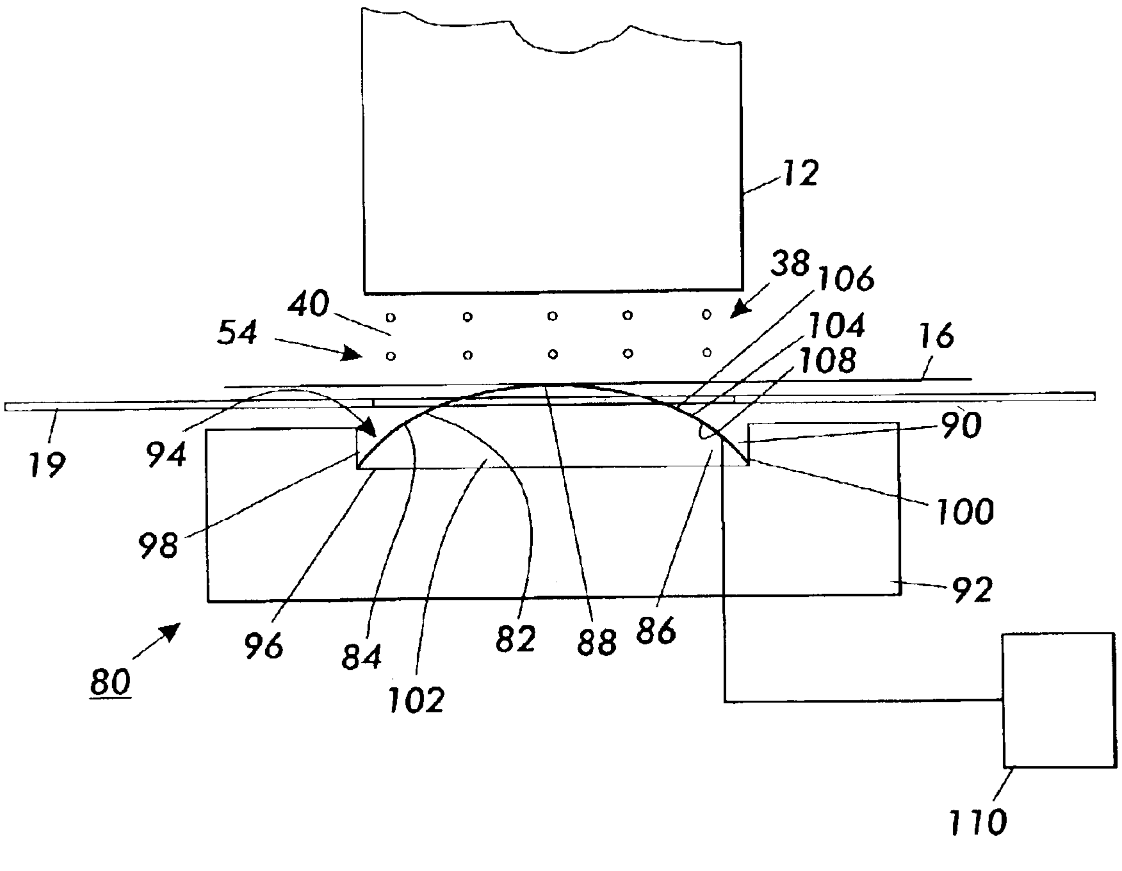
FIG. 2 is an enlarged illustration of the curved infrared foil heater of FIG. 1 in accordance with the present invention.

As illustrated, the second heating area 54 is provided by the self-tensioning heater assembly 80 of the present invention. As shown in FIGS. 1 and 2, the self-tensioning heater assembly 80 includes a foil heater 82 having a first end 84, a second end 86, and a convex arc portion 88 that lies between the first end 84 and the second end 86 in the printing zone 38.

The foil heater 82 is mounted inside a channel 90 in a frame 92. The channel 90 can be etched or milled or otherwise formed in the solid frame 92. The channel 90 has an open end 94 in the printing zone 38 adjacent to the recording medium 16 in the recording medium path 19 and a closed end 96, opposite the open end 94. The channel 90 has a first side 98, perpendicular to the recording medium 16 in the recording medium path 19, and closest to the first heating area 52 in the recording medium path 19. The channel 90 has a second side 100, perpendicular to the recording medium 16 in the recording medium path 19, opposite the first side 98, and closest to the output tray 44 in the recording medium path 19.

The generally flat foil heater 82 has a width larger than the width of the channel 90. The foil heater will be bent to form a convex curve 88 as it is mounted with the first end 84 of the foil heater pressing against the first side 98 of the channel and the second end 86 of the heater pressing against the second side 100 of the channel. The ends of the foil heater may be bonded or secured by adhesive to the sides of the channel.

The convex curved portion 88 of the foil heater 82 is in the recording medium path 19 of the recording medium 16 and the convex curved portion of the foil heater 82 will contact, physically and thermally, the recording medium 16 to actively dry the deposited ink on the paper.

The foil heater 82 is in the printing zone 38 on the opposite side of the recording medium 16 from the print head 12. The foil heater will heat the side of the paper 16 that does not have ink deposited on it. The length of the foil heater is approximately equal to the width of the recording medium to be actively dried.

By being bent into a curve under constant self-tension, the foil heater mounted inside the channel eliminates wrinkling of the heater surface due to thermal expansion of the foil heater, thereby insuring uniform contact between the convex foil heater and the recording medium 16. Bending of the foil heater in one axis between the sides of the channel prevents wrinkles form occurring in the other axis along the surface of the recording medium. By creating a smooth and uniform heater surface, good contact with the paper is achieved to maximize heat transfer and therefore drying efficiency.

The airgap 102 between the curve 88 of the foil heater 82 and the closed end 96 of the channel 90 minimizes heat loss from the foil heater 82. The mounted technique of securing just its first and second ends 84, 86 (that is upstream and downstream edges relative to movement of the recording medium 16) advantageously minimizes heat loss (heat sinking) from the foil heater 82 to other parts of the printer 10. The frame 92 or just an inner lining in the channel 90 around the sides 98, 96, 100 can be a ceramic insulating material to further minimize heat loss.

A shown in FIG. 2, the foil heater 82 consists of thin circuit NiChrome (nickel chromium alloy) wire 104 sandwiched between a top layer 106 and a bottom layer 108 of heat resistant polymer such as Kapton (polyimide) or polyester. The selection of materials is based primarily on the operating temperature of the heater.

Serpentine shaped NiChrome electrically conductive strips 104 perform well as the infrared emitting, heating element of the foil heater. Orientation of the heat wire runs in the construction are parallel to the motion of the print head and perpendicular to the paper motion. The layer sandwiching the NiChrome element provides support for the heater core. The choice of sandwiching materials is primarily driven by the operating temperatures. Kapton (polyimide) is used for high operating temperatures, for instance, greater than 300 degrees F. Polyester, on the other hand, can be used for lower operating temperatures, for instance, approximately 200 degrees F. Since the construction is made primarily of a plastic, the foil heater is very flexible.

As seen in FIGS. 1 and 2, a voltage will be applied to the foil heater 82 by power source 110 to generate heat from infrared radiation in the printing zone 38 to dry the ink droplets on the recording medium 16.

While nickel chromium alloy is the preferred medium for heating to produce IR radiation from the foil heater, other conductive materials such as chromium aluminum and iron alloy or nickel chromium and iron alloy may be used.

The described flexible heater is also known as a foil heater. Other types of flexible heaters, however, are within the scope of the present invention. For instance, any flexible heater having a low thermal mass is acceptable, such as wire resistive elements traversing a support medium, carbon loaded film, metal film photopatterned with runs of graphite material, or conductive material sprayed or doctor bladed on a support medium.

The channel in the frame can alternately be an external bracket or other physical or mechanical restraining means to compress the foil heater to form a curve which self-tensions the foil heater to avoid wrinkling and still maintain a uniform thermal and physical contact with the recording medium.

The second heating area 54 provides the primary drying function for driving the liquid from the ink deposited by the print head on the paper in the print zone.

As can be seen, there has been provided an ink jet printing machine for printing liquid ink images on a recording medium moving along a recording medium path through a printing zone. The printing machine includes a print head for image-wise depositing liquid ink droplets on the recording medium, and a self-tensioning curved flexible heater assembly for heating the recording medium to dry the image-wise liquid ink droplets. The self-tensioning curved flexible heater assembly is disposed adjacently to the recording medium path opposite the print head, for heating the recording medium, and comprises a flexible heating strip mounted by the first end and the second end to form the convex curve, thereby providing self-tensioning and preventing wrinkling despite thermal expansion thereof.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A heater assembly for drying ink images on a recording medium, the heater assembly comprising:

a channel in a frame, said channel having a first side and a second side perpendicular to an open end, said first side opposite said second side; and a heating member having a first edge and a second edge, said heating member being mounted in said channel, said first edge of said heating member being against said first side of said channel, said second edge of said heating member being against said second side of said channel, said mounting of said heating member in said channel creating a convex curve shape to said heating member that produces self-tensioning in said heating member and a gap underneath said heating member, said convex curve shape of said heating member extending out of an open end of said channel, thereby insuring uniform contact between said heating member and said recording medium.

2. The heater assembly of claim 1 wherein said heating member is a foil heater.

3. The heater assembly of claim 2 wherein said foil heater includes electrically conductive strips within said foil heater.

4. An ink jet printing machine for printing liquid ink images on a recording medium moving along a recording medium path through a printing zone, comprising:

a channel in said frame;

a print head containing liquid ink for depositing image-wise onto said recording medium to form ink images; and a heater assembly along the recording medium path opposite said print head for drying the ink images on the recording medium, the heater assembly comprising:

a channel in a frame, said channel having a first side and a second side perpendicular to an open end, said first side opposite said second side; and a heating member having a first edge and a second edge, said heating member being mounted in said channel, said first edge of said heating member being against said first side of said channel, said second edge of said heating member being against said second side of said channel, said mounting of said heating member in said channel creating a convex curve shape to said heating member that produces self-tensioning in said heating member and a gap underneath said heating member, said convex curve shape of said heating member extending out of an open end of said channel, thereby insuring uniform contact between said heating member and said recording medium.

5. The ink jet printing machine of claim 4 wherein said heating member is a foil heater.

6. The ink jet printing machine of claim 5 wherein said foil heater includes electrically conductive strips within said foil heater.

* * * * *